(12) United States Patent
Shen et al.

(10) Patent No.: US 7,132,584 B2
(45) Date of Patent: Nov. 7, 2006

(54) METHOD OF USING HIGH TEMPERATURE PLASMA TO DISINTEGRATE WASTE CONTAINING TITANYL PHTHALOCYANINE

(75) Inventors: Yu-Ting Shen, Tainan Hsien (TW); Chih-Wei Kuo, Tali (TW); Ling Lu, Taoyuan Hsien (TW); Chan-Yi Chen, Tainan Hsien (TW); Chang-Lung Hsieh, Chungho (TW); Chi-Ho Fu, Hsintien (TW); Bun-Ching Liu, Taipei (TW); Fu-Chen Liu, Hualien Hsien (TW); Chen-Lin Huan, Kaohsiung Hsien (TW)

(73) Assignees: Labeltek Inc., Taipei (TW); Tai Chan Environmental Technologies Ltd., Taipei Hsien (TW)

( * ) Notice: Subject to any disclaimer, the term of this patent is extended or adjusted under 35 U.S.C. 154(b) by 243 days.

(21) Appl. No.: 10/775,066

(22) Filed: Feb. 11, 2004

(65) Prior Publication Data

US 2005/0177018 A1  Aug. 11, 2005

(51) Int. Cl.
*A62D 3/00* (2006.01)
(52) U.S. Cl. ............ 588/311; 588/252; 588/256; 588/407; 588/408
(58) Field of Classification Search .......... 588/311, 588/407, 408, 252, 256
See application file for complete search history.

(56) References Cited

U.S. PATENT DOCUMENTS

| 5,026,464 | A | * | 6/1991 | Mizuno et al. | 588/311 |
|---|---|---|---|---|---|
| 5,090,340 | A | * | 2/1992 | Burgess | 588/311 |
| 5,319,176 | A | * | 6/1994 | Alvi et al. | 588/311 |
| 5,637,127 | A | * | 6/1997 | McLaughlin et al. | 65/134.8 |
| 5,732,365 | A | * | 3/1998 | Howard et al. | 588/10 |
| 5,877,394 | A | * | 3/1999 | Kujawa et al. | 588/311 |
| 6,340,863 | B1 | * | 1/2002 | Ikeda et al. | 315/111.21 |
| 6,576,807 | B1 | * | 6/2003 | Brunelot et al. | 588/311 |
| 2005/0049450 | A1 | * | 3/2005 | Shen et al. | 588/311 |

* cited by examiner

*Primary Examiner*—Stanley S. Silverman
*Assistant Examiner*—Ardith E. Hertzog
(74) *Attorney, Agent, or Firm*—Rosenberg, Klein & Lee

(57) ABSTRACT

A method of using high temperature plasma to disintegrate waste containing titanyl phthalocyanine (TiOPc) comprises heating a mixture of titanyl phthalocyanine (TiOPc), a vitrifying material and optionally selected waste soil to a temperature of 1,220° C. to 10,000° C. until the mixture becomes a molten lava. The plasma breaks down the titanyl phthalocyanine and encapsulates the benign products in the lava that is chemically very stable. Since the titanyl phthalocyanine (TiOPc) is disintegrated completely in the process, the titanyl phtbalocyanine (TiOPc) no longer represents a threat to the environmental.

6 Claims, 9 Drawing Sheets
(2 of 9 Drawing Sheet(s) Filed in Color)

METHOD OF USING HIGH TEMPERATURE PLASMA TO DISINTEGRATE WASTE CONTAINING TITANYL PHTHALOCYANINE

BACKGROUND OF THE INVENTION

1. Field of the Invention

The present invention relates to a method of using high temperature plasma to neutralize toxic or hazardous material, and more particularly to a method of using high temperature plasma to disintegrate organic photo-conductor material waste containing titanyl phthalocyanine (TiOPc) to non-toxic and non-hazardous materials.

2. Description of Related Art

Plasma is a highly ionized and high temperature gas, is a combination of molecules, atoms, electrons and positive ions and is considered to be a "fourth state of matter" in addition to solid, liquid, and gas. High temperature plasma is a clean thermal-source that disintegrates large molecules without combustion. The disintegration of the waste is a process involving energy transmission and conversion. Compounds subjected to the high temperature plasma disintegrate, and energy of the compounds in the plasma is transmitted to the waste within electric arcs in the high temperature plasma. When the waste and high temperature plasma interact, electrons in the molecules and atoms of the waste are stripped away from the nucleus of the atoms, break the bonds between atoms of the waste compounds and fundamentally completely destroy the waste. Ideally, using high temperature plasma to break down waste only generates some simple molecules or atoms such as hydrogen atom, carbon oxide, carbon atom, and hydrochloride because the simple molecules or atoms can not recombine into complex molecule in the high temperature plasma.

Presently, flammable wastes are treated by incineration. However, incinerating equipment does not completely breakdown the waste and often results in the generation of some toxic products. Consequently, subsequent processes are required to treat the toxic products and are troublesome. Particularly, organic waste of organic photo-conductor (OPC), i.e. titanyl phthalocyanine (TiOPc), cannot be disintegrated by incineration and is classified as nonflammable material. Therefore, organic photo-conductor waste containing titanyl phthalocyanine is a significant waste treatment system problem for manufacturers.

To overcome the shortcomings, the present invention provides a method using high temperature plasma to disintegrate waste containing titanyl phthalocyanine (TiOPc) to mitigate or obviate the problems.

SUMMARY OF THE INVENTION

The main objective of the invention is to provide a method using high temperature plasma to disintegrate waste containing titanyl phthalocyanine completely to simplify subsequent processes in waste treatment systems.

Other objects, advantages and novel features of the invention will become more apparent from the following detailed description when taken in conjunction with the accompanying drawings.

BRIEF DESCRIPTION OF THE DRAWINGS

The patent or application file contains at least one drawing executed in color. Copies of this patent or patent application publication with color drawings (FIGS. 1 and 2) will be provided by the Office upon request and payment of the necessary fee.

DETAILED DESCRIPTION OF PREFERRED EMBODIMENT

Figure 1:
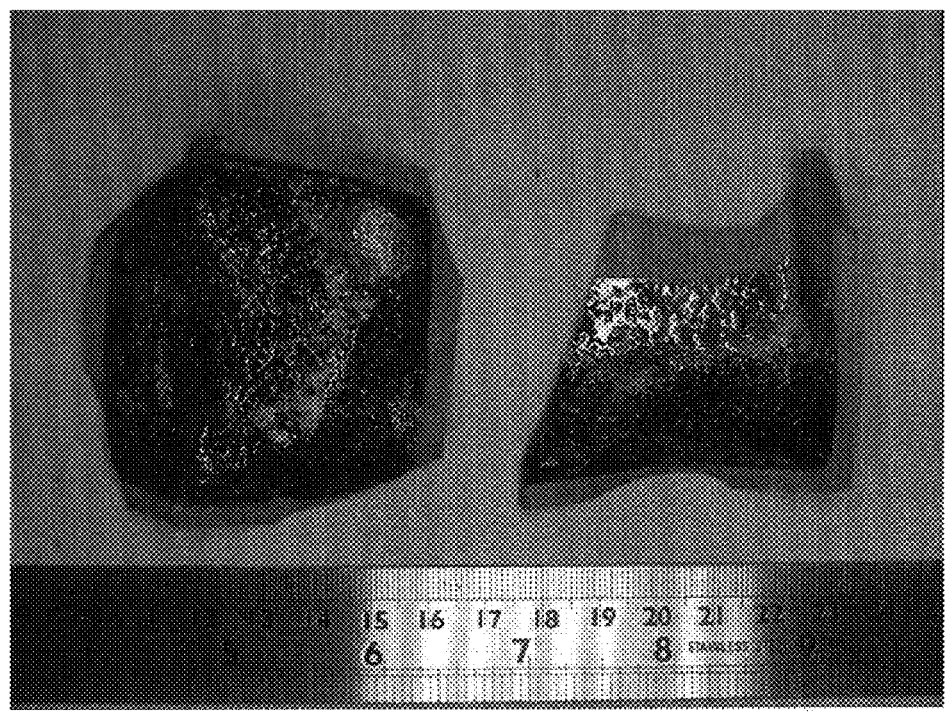
FIG. 1 is a color drawing of lava from example 1 (glass: soil: TiOPc=7:10:3) after treatment with high temperature plasma in accordance with the present invention.

A method of using high temperature plasma to disintegrate titanyl phthalocyanine (TiOPc) comprises acts of heating a mixture of titanyl phthalocyanine, selected waste soil and waste glass or other vitreous materials in a plasma and cooling a resultant lava. The mixture is heated in the plasma to a temperature of 1,220° C. to 10,000° C. The preferred temperature is from 1,220° C. to 1,456° C. The plasma breaks down the titanyl phthalocyanine into simple benign molecules, and the temperature melts the selected waste soil and waste glass or other vitreous materials to a stable molten vitreous lava. The simple benign molecules resulting from the plasma breakdown of the titanyl phthalocyanine are suspended in the stable molten vitreous lava. When the molten vitreous lava cools and solidifies, the simple benign molecules resulting from the plasma breakdown of the titanyl phthalocyanine are encapsulated in the solid vitreous lava. In the examples, the solid vitreous lava after cooling and being removed from the plasma was tested to analyze its structure and determine the level of titanyl phthalocyanine (TiOPc) in the solid vitreous lava.

Because using high temperature plasma to treat waste is extremely safe, easily controlled and non-polluting, high temperature plasma can treat various waste much more efficiently than incinerating furnaces. Moreover, final products of high temperature plasma treatment are in forms of lava that is chemically very stable and has a low leaking rate to satisfy strict environmental protection requirements. Several advantages of using high temperature plasma treatment follow.

1. High temperature plasma directly acts on the waste so that loss of thermal energy is reduced.

2. The high temperature plasma can be selectively generated in a nitrogen or air environment. Consequently, specific chemical reactions can be carried out, which cannot be achieved in incinerating furnaces. For example, the high temperature plasma efficiently removes and destroys organic waste in an inert atmosphere and easily reduces the metallic oxide to metal in a reducing environment. Therefore, method of using high temperature plasma to disintegrate waste can be applied simultaneously to various types of wastes such as mixed waste containing flammable and nonflammable materials, metallic waste, toxic waste (chloro-biphenyl, dioxin), contaminated soil, organic hydrocarbon waste (such as waste oil, plastic and resin), filtered residue from waste liquid treatment plants, and residue from incinerating furnaces, etc.

3. The waste can be disintegrated completely without any pre-treatment. Therefore, no operator is exposed to the toxic waste, and costs for pre-treatment are eliminated.

4. Exhaust gases in the high temperature plasma system are minimized, and ash is not easily distributed in pipes so cleaning equipment for the exhausting gases is simple.

5. The solid vitreous lava is formed and molded in blocks during the process and does not require a second treatment so the subsequent processes are obviated. Furthermore, the solid vitreous lava is chemically very stable and has a low titanyl phthalocyanine (TiOPc) leakage rate.

To further understand the method of using high temperature plasma in accordance with the present invention, examples follow with reference to FIGS. 1–9.

EXAMPLES

Samples used were composed of titanyl phthalocyanine (TiOPc), selected waste soil and waste glass. A 100 kilowatt high temperature plasma melting furnace having a maximum temperature greater than 10,000° C. at a center of the heating source and an electrical density greater $1\times10^{16}$ electrons/cm$^3$ provided a heating source to heat the samples. The medium of the high temperature plasma was air. The rate the temperature increases rate and the time that the temperature of the melting furnace was maintained were controlled by adjusting direct current and air inflow rate. In this example, the rate the temperature increases was 7° C./min. A crucible composed of 10% chromium oxide and 90% aluminum oxide was used to hold the samples. The crucible was rectangular, 6.5 cm in length, 6.5 cm in width, 17 cm deep and 1 cm thick. To distribute the temperature evenly in the melting furnace, multiple ventilating holes were defined in a fire-resistant bottom of the melting furnace to exhaust gas through the ventilating holes to an exhaust pipe. Because temperature was measured with a thermocouple attached to an outer periphery of the crucible, detected temperature was lower than the actual temperature of the samples inside the crucible.

After treating the samples in the high temperature melting furnace, the lava was analyzed to define crystallization of the lava by an X-ray diffractometer (XRD, K$\alpha\lambda$=1.5406 Å) and was tested to determine the quantity of residual titanyl phthalocyanine (TiOPc) in the solidified lava by ultraviolet-visible light spectrophotometer.

Figure 2:
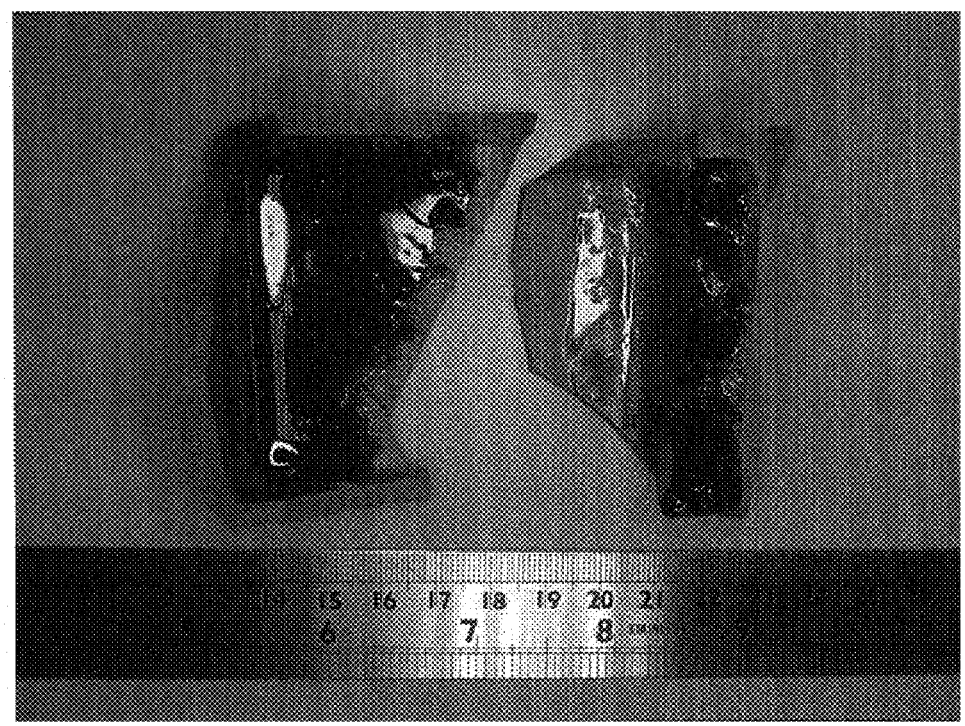
FIG. 2 is a color drawing of lava from example 2 (glass: TiOPc=17:3) after treatment with high temperature plasma in accordance with the present invention.
Figure 3:
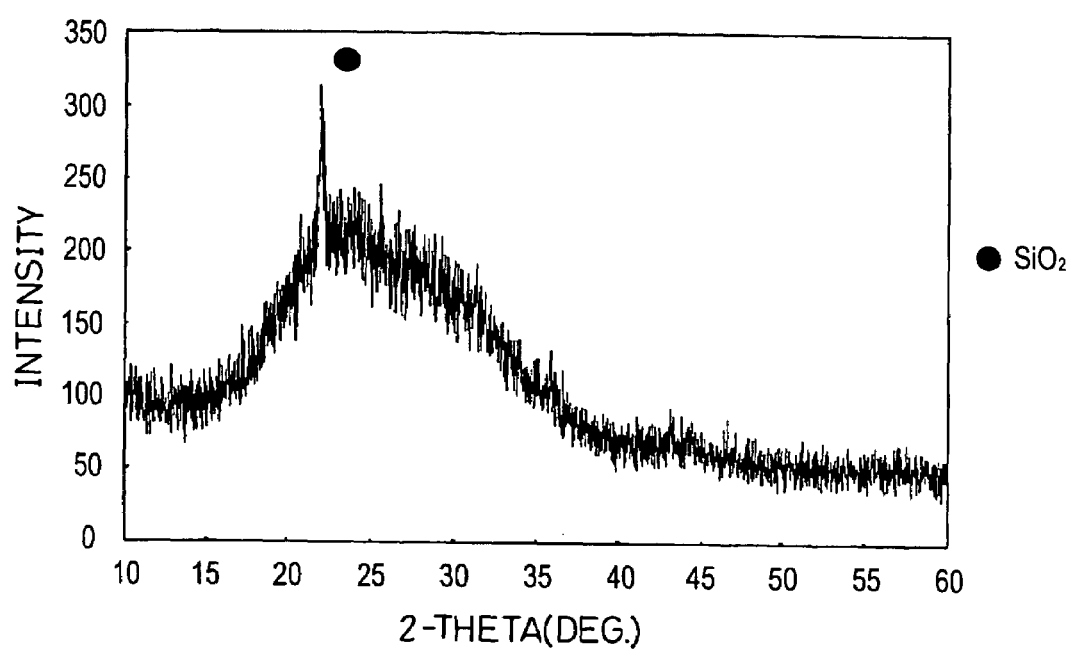
FIG. 3 is an X-Ray Diffractometer (XRD) spectrum of the lava from example 1.
Figure 4:
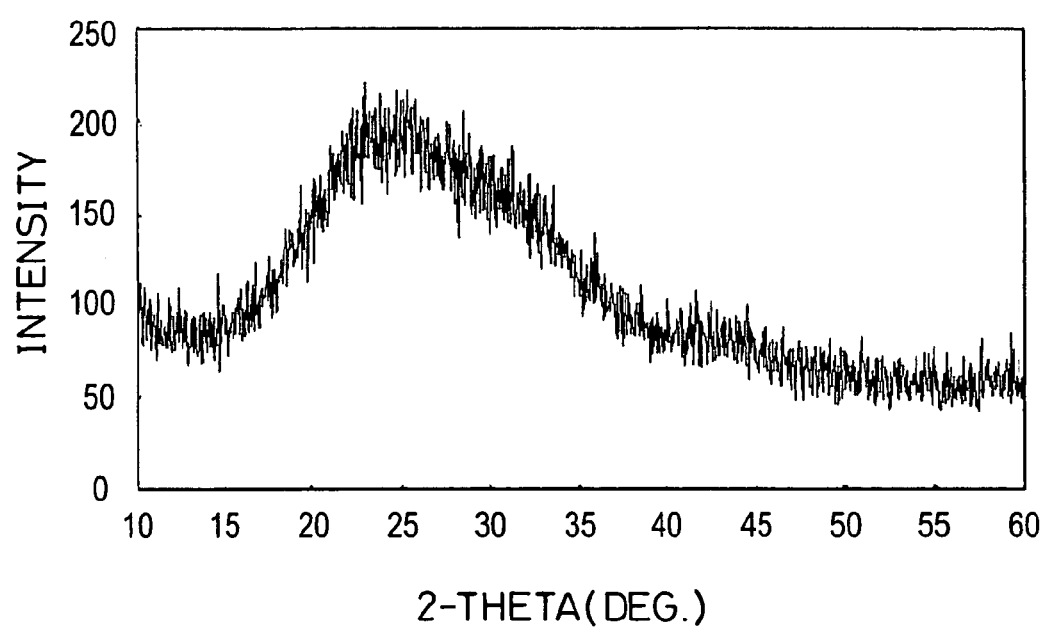
FIG. 4 is an XRD spectrum of the lava from example 2.

The samples were composed of waste glass, waste soil and titanyl phthalocyanine (TiOPc) in different ratios. Example 1 had a ratio of glass:soil:TiOPc of 7:10:3, and example 2 had a ratio of glass:TiOPc of 17:3. The samples were treated at 1,220° C. for one hour and heated to 1,456° C. until the samples become vitrified in appearance as shown in FIGS. 1 and 2. With reference to FIGS. 3 and 4, the lava of example 1 and the lava of example 2 were both vitrified.

Figure 5:
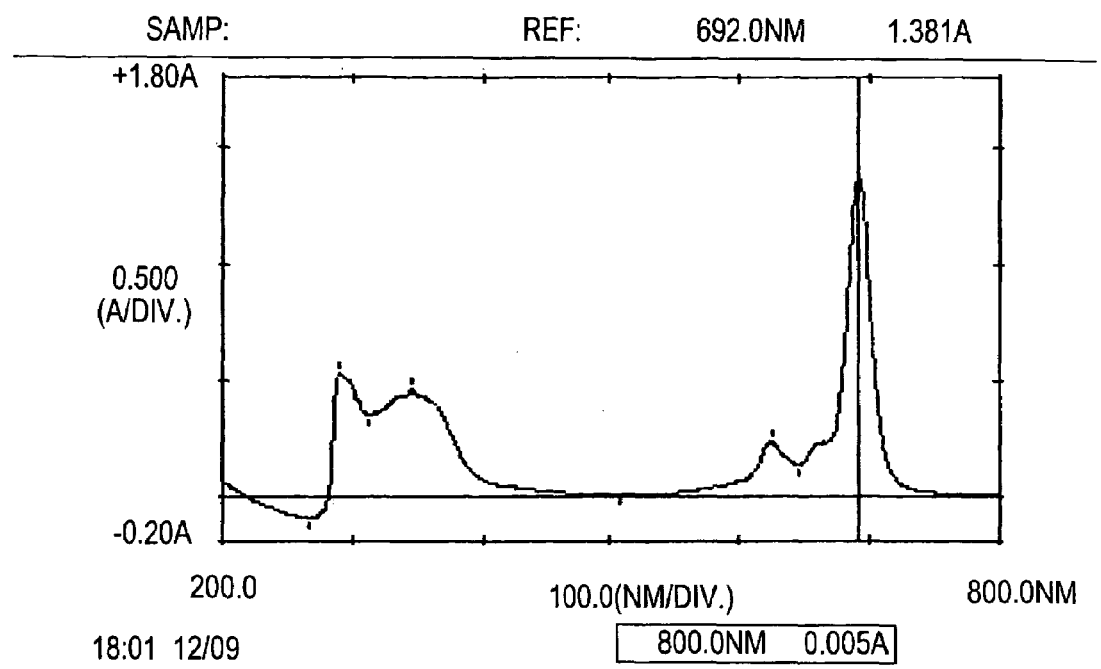
FIG. 5 is an (ultraviolet)-(visible light) spectrophotometer spectrum of a standard sample not treated by high temperature plasma.
Figure 6:
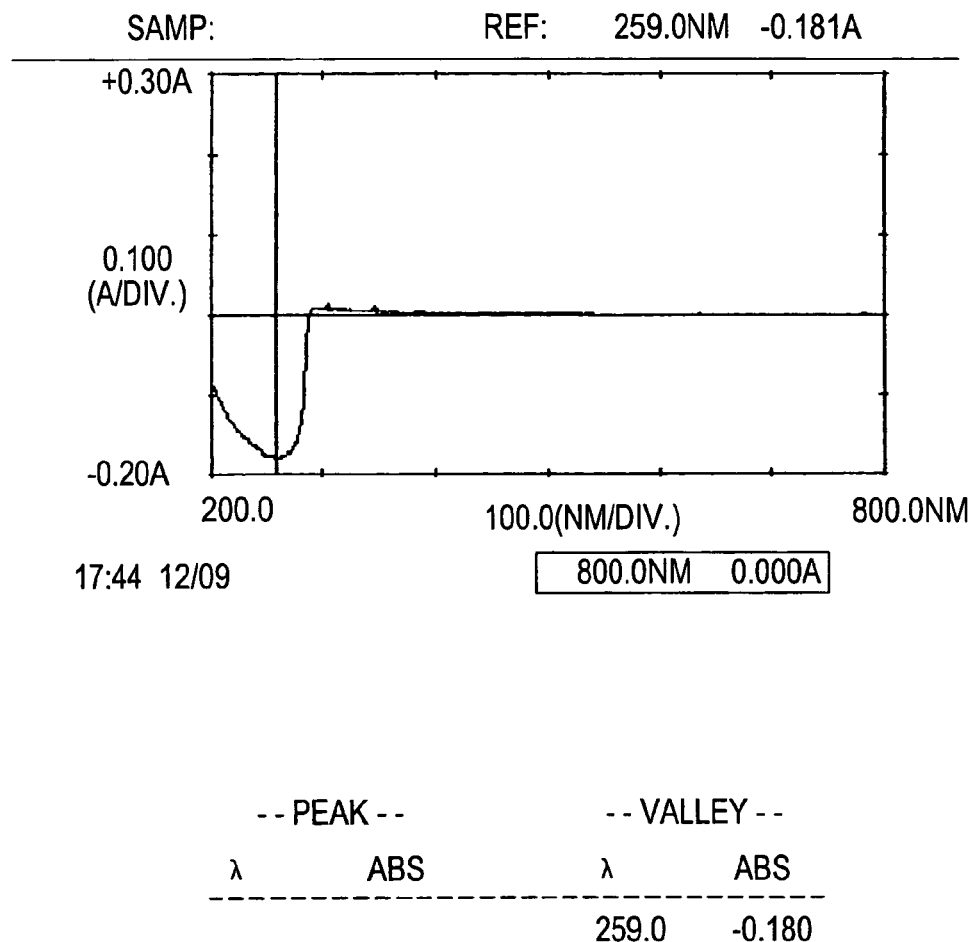
FIG. 6 is an (ultraviolet)-(visible light) spectrophotometer spectrum of a standard sample of solvents.
Figure 7:
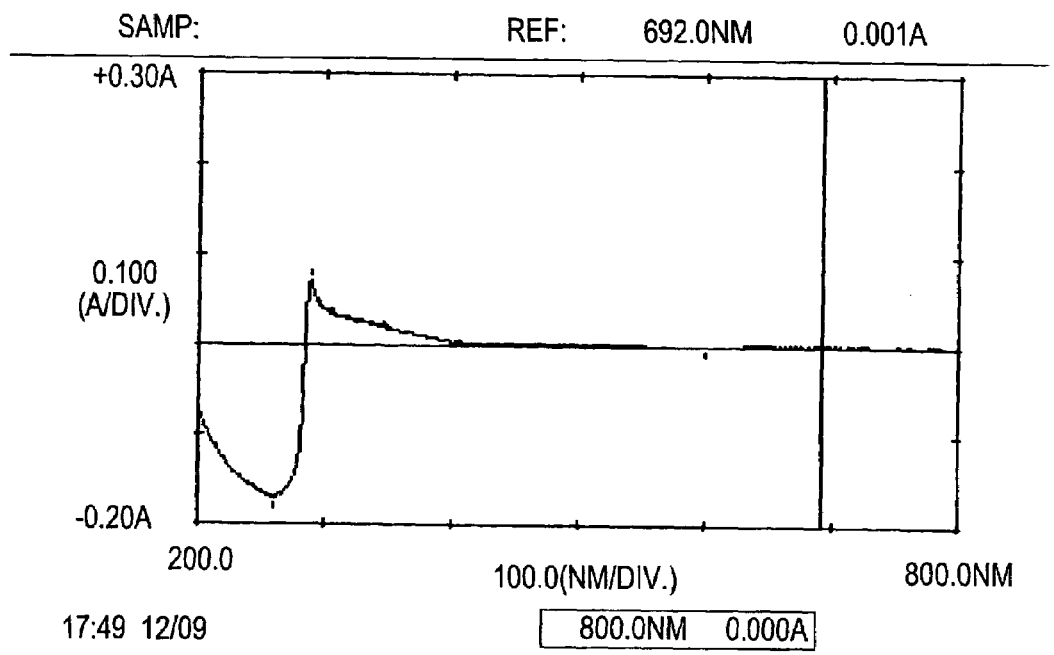
FIG. 7 is an (ultraviolet)-(visible light) spectrophotometer spectrum of a standard sample of glass.
Figure 8:
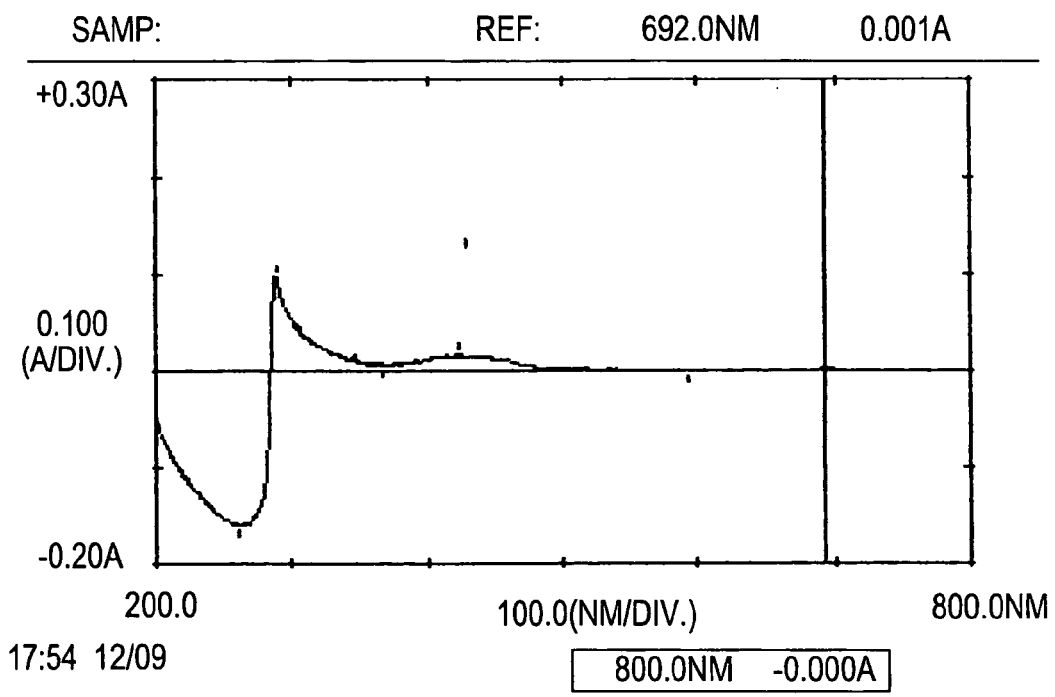
FIG. 8 is an (ultraviolet)-(visible light) spectrophotometer spectrum of a standard sample of the lava from example 1.
Figure 9:
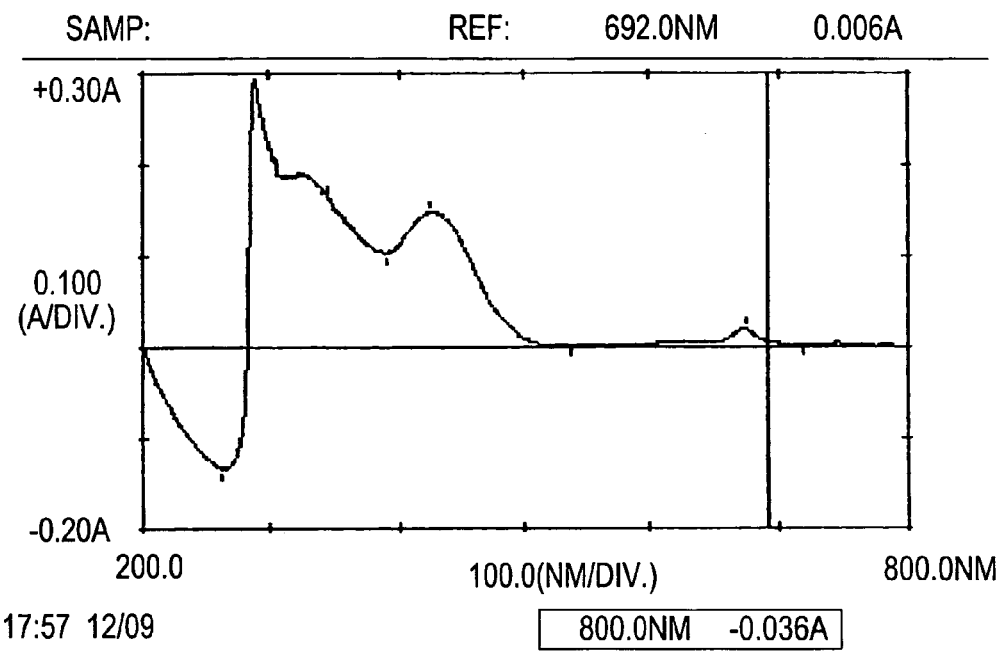
FIG. 9 is an (ultraviolet)-(visible light) spectrophotometer spectrum of a standard sample of the lava from example 2.

With reference to FIG. 5, a (ultraviolet)-(visible light) spectrophotometer analysis of a standard sample containing titanyl phthalocyanine (TiOPc) not treated with high temperature plasma has a major peak at 692 nm that represents the titanyl phthalocyanine (TiOPc) peak. With reference to FIG. 6, a spectrum of a solvent used in the mixture was obtained as a standard. With reference to FIG. 7, a spectrum of waste glass treated with high temperature plasma was obtained to be used as a standard. The spectrums of example 1 and example 2 were compared with the standards obtain to determine how much titanyl phthalocyanine (TiOPc) was in the solidified lava. With reference to FIGS. 6 and 7, no peak exists at 692 nm, which means no titanyl phthalocyanine (TiOPc) is present. In the spectrum of example 1 (FIG. 8) and the spectrum of example 2 (FIG. 9), no peak at 692 nm is found either. Therefore, no titanyl phthalocyanine (TiOPc) is left in the final solidified lava of example 1 and 2.

Based on the foregoing description, the method for using high temperature plasma to treat titanyl phthalocyanine (TiOPc) has the following novel features:

1. The high temperature plasma can disintegrate the titanyl phthalocyanine (TiOPc) completely, which is a marked improvement over conventional incinerating methods.

2. The final product of the high temperature plasma is lava, not dust, residue or other toxic materials as found in conventional incinerating furnaces. The lava is chemically very stable in comparison to the dust and residue and does not need to undergo any troublesome subsequent processes.

3. The method of using high temperature plasma provide as an easy way to resolve the treatment problem of organic photo-conductor with titanyl phthalocyanine (TiOPc).

Even though numerous characteristics and advantages of the present invention have been set forth in the foregoing description, together with details of the function of the invention, the disclosure is illustrative only, and changes may be made in detail, especially in matters of compositions of samples, within the principles of the invention to the full extent indicated by the broad general meaning of the terms in which the appended claims are expressed.

What is claimed is:

1. A method of using high temperature plasma to disintegrate titanyl phthalocyanine (TiOPc) comprising:
   heating a mixture of titanyl phthalocyanine and a vitrifying material with high temperature plasma to a temperature of 1,220° C. to 10,000° C. until the mixture becomes a molten lava; and
   cooling the molten lava until the lava solidifies.

2. The method as claimed in claim 1, wherein the vitrifying material is glass, and the mixture has a glass to TiOPc ratio of 17:3.

3. The method as claimed in claim 2, wherein the temperature is within a range of 1,220° C. to 1,456° C.

4. The method as claimed in claim 1, wherein the mixture further comprises soil.

5. The method as claimed in claim 4, wherein the vitrifying material is glass, and the mixture has a glass to soil to TiOPc ratio of 7:10:3.

6. The method as claimed in claim 5, wherein the temperature is within a range of 1,220° C. to 1,456° C.

* * * * *